Dec. 17, 1968   K. WILMOT   3,416,499
DRINKING VALVES FOR POULTRY
Filed June 19, 1967
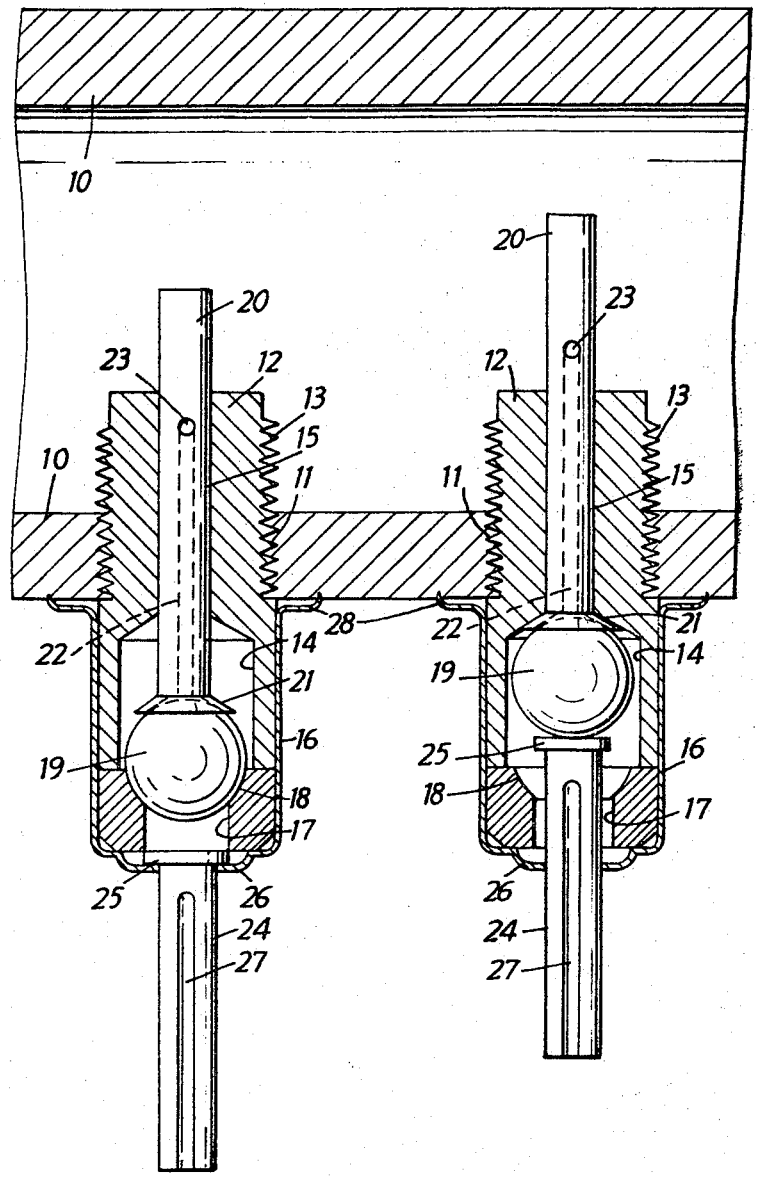
INVENTOR
KENNETH WILMOT
By Young & Thompson
ATTYS.

United States Patent Office 3,416,499
Patented Dec. 17, 1968

3,416,499
DRINKING VALVES FOR POULTRY
Kenneth Wilmot, Clitheroe, England, assignor to John Blake Limited, Clayton-le-Moors, Accrington, Lancashire, England, a British company
Filed June 19, 1967, Ser. No. 646,958
Claims priority, application Great Britain, June 24, 1966, 28,547/66
8 Claims. (Cl. 119—72.5)

ABSTRACT OF THE DISCLOSURE

A valve arrangement for delivering drinking water to poultry has a body portion which is inserted in a water supply line and which has a depending stem which is upwardly movable by the beak of the animal to obtain a supply of water. The body portion is provided with a through passage the upper portion of which is closed by a movable stem having a water inlet passage normally within the body portion. The lower portion of the through passage is closed by a ball valve with the lower end of the movable stem resting on top of the ball. Upward movement of the depending stem opens the ball valve to lift the movable stem to expose the water inlet passage to the water supply to enable water to flow through the valve and down the depending stem.

---

The present invention relates to valve arrangements for the delivery of drinking water to poultry.

Drinking valves are particularly used in the water supply pipes of poultry batteries, the supply pipe extending past a number of cages each of which is provided with a drinking valve. In a number of prior proposals, the valve has a depending stem to which upward pressure is applied by the beak of the bird whereupon drops of water are automatically delivered until they are cut off by the removal of the upward pressure.

There are, however, a number of problems in connection with these drinking valves of which the most important is the prevention of waste. In a large battery installation, a large number of valves will be used and if the valves do not completely cut off the water when upward pressure is removed from the depending stem, a considerable wastage of water ensues. Water wastage can also be caused by dirt in the water lodging in the valve and preventing the proper operation of the valve. It is therefore important in designing a drinking valve, first to ensure that the cut-off valve is efficient in operation and second to ensure that the possibility of dirt clogging in the valve is reduced to a minimum.

It is the object of the present invention to provide a drinking valve in which both these criteria are met in an economical manner.

According to the invention, in a valve arrangement for the delivery of drinking water to poultry and comprising a body portion inserted into a water supply line and having a depending stem which is upwardly movable by the beak of the animal to obtain a supply of water, the body portion is provided with a through passage the upper portion of which is closed by a movable stem having water inlet passage normally within the body portion whereas the lower portion is closed by a ball valve, the lower end of said movable stem resting on top of the ball and upward movement of the depending stem opens the ball valve whereby the movable stem is lifted to expose the water inlet passage to the water supply to enable water to flow through the valve and down the depending stem.

The invention will be better understood from the following description of one embodiment taken in conjunction with the accompanying drawing which shows a cross-sectional view of two valve arrangements according to the invention, the one on the left being in the closed position and that on the right being in the open position.

Referring to the drawing, the two valve arrangements are shown in position in a water supply pipe 10 of rectangular cross-section and of which the top and bottom walls only are shown. The valve arrangement which is screwed into a threaded aperture 11 in the bottom wall of the pipe 10, consists of a cylindrical stainless steel body portion 12 having a screw thread 13 on the outer surface of the upper portion thereof, the screw thread mating with the screw thread of the aperture 11. The body portion is provided internally with a cylindrical chamber 14 which merges with a cylindrical, upwardly-directed passage 15. The body portion is a press fit in a cylindrical stainless steel shell or tank 16 having a cylindrical passage 17 extending downwardly from a circular seating 18 for a stainless steel ball 19. The ball 19 is accurately spherical and is coined into the seat 18 to form a tight seal. A stem 20 is inserted into the upwardly-extending passage 15 of the valve body and is provided with a circular hood 21 which rests under gravity on the top of the ball. The stem 20 is provided with an axial bore 22 which terminates below the upper end of the stem in a transverse passage 23. A stem 24 is also provided in the shell 16 and has an enlarged head 25 working in the passage 17, the stem being maintained within the passage by a restricted opening 26 in the shell. The stem 24 is provided externally with a longitudinal groove 27 along which the drops of water are delivered.

When the valve arrangement is closed, the position taken up by the various components is as shown in the left-hand side of the drawing. The stem 24 rests under gravity at the bottom of passage 17 and the ball 19 rests on its seating 18. Stem 20 rests under gravity on the top of ball 19. It is to be noted that the transverse passage 23 in the stem 20 is withdrawn into the body portion 12 so that no water can pass into the body portion in this condition.

When the animal wants to drink, it lifts the stem 24 with its beak so that the head 25 engages with and lifts the ball 19 and the stem 20. This condition is shown at the right of the drawing. In the raised position of the stem 20, water flows into the transverse passage 23 of the stem 15 and through the axial bore 22. It is to be noted that although the ball 19 when on its seating 18 seals off the chamber 14 from the passage 17, it does not seal off the chamber 14 from the axial bore 22 when it is in its uppermost position. Hence the water in the axial passage 22 flows into the chamber 14 and along the groove 27 to the animal.

It will be seen that because the transverse passage 23 is within the body portion in the cut-off condition, the water can only seep into the chamber 14 around the circumference of the stem 20 and since the stem is manufactured to be a close fit in the passage 15, the amount of water seeping into the chamber 14 is small. In addition the ball 19 since it is coined on the seat 18 provides a second seal against flow of water into the passage 17. It is to be noted that there is an appreciable spacing between the head 25 of the stem 24 and the ball 19 in the cut-off condition and it is found that this assists in preventing flow of water past the ball. Another cause of water wastage is through seepage along the screw thread between the body portion and the wall of the water supply pipe. These pipes are usually made of plastics material and to avoid seepage, the upper edge of the shell 14 is shaped at 28 so that when the valve body is screwed into the aperture 11, the edge of the shell 16 bites into the wall of the supply pipe and forms a seal. Alternatively a rubber or like flexible sealing ring may be inserted between the shell and the supply pipe.

It will also be understood that since the transverse passage 23 in the stem 20 is withdrawn into the body portion in the cut-off condition, the possibility of foreign matter being introduced into the valve arrangement from the water is much reduced compared with constructions in which water continuously surrounds the water inlet.

I claim:

1. A poultry actuated valve arrangement for the delivery of drinking water to poultry and comprising a body portion inserted into a water supply line and having a depending stem which is upwardly movable by the beak of the animal to obtain a supply of water, wherein the body portion is provided with a through passage the upper portion of which is closed by a movable stem having a water inlet passage normally within the body portion whereas the lower portion is closed by a ball valve, the lower end of said movable stem resting on top of the ball and upward movement of the depending stem opens the ball valve whereby the movable stem is lifted to expose the water inlet passage to the water supply to enable water to flow through the valve and down the depending stem.

2. A valve arrangement as claimed in claim 1, wherein the body portion is formed in two parts, of which the upper part is inserted in the water supply line and the lower part is in the form of a shell which encloses the protruding end of the first part in a press fit, the lower part also including a seating for the shell.

3. A valve arrangement as claimed in claim 2, wherein the upper perimeter of the shell is shaped to that when the upper and lower parts are assembled and inserted in the water supply line, the upper perimeter of the shell bites into the surface of the supply line.

4. A valve arrangement as claimed in claim 2, wherein the upper perimeter of the shell is shaped to receive a sealing ring of flexible material so that when the upper and lower parts are assembled and inserted in the water supply line, the sealing ring is engaged by the upper perimeter of the shell, the upper part and the outer surface of the water supply line to form a water tight joint.

5. A valve arrangement as claimed in claim 1, wherein the ball is accurately spherical and is coined into the seating.

6. A valve arrangement as claimed in claim 1, wherein the movable stem is provided with an axial bore which communicates with a transverse passage, the transverse passage normally being within the body and being lifted clear of the body to allow ingress of water when the depending stem is moved upwardly by the beak of the animal.

7. A valve arrangement as claimed in claim 1, wherein the depending stem is provided with a longitudinal groove along which drops of water are delivered.

8. A valve arrangement as claimed in claim 2, wherein the body portion, shell, ball valve and seating are all formed of stainless steel.

References Cited

UNITED STATES PATENTS

| 2,851,007 | 9/1958 | Kagan | 119—72.5 |
| 3,008,451 | 11/1961 | Curry | 119—72.5 |
| 3,228,377 | 1/1966 | Grassano | 119—72.5 |

FOREIGN PATENTS 957,300  5/1964  Great Britain.

ROBERT B. REEVES, *Primary Examiner.*

N. L. STACK, *Assistant Examiner.*

U.S. Cl. X.R.

222—422, 501; 137—614.18